United States Patent [19]
Dinger et al.

[11] Patent Number: 5,438,556
[45] Date of Patent: Aug. 1, 1995

[54] HOROLOGICAL PIECE COMPRISING A PHOTOVOLTAIC CELL HAVING A PHOTELECTROCHEMICAL REGION

[75] Inventors: Rudolf Dinger, St-Aubin; Eric Saurer, Bevaix; Michael Graetzel, St-Sulpice, all of Switzerland

[73] Assignee: Asulab S.A., Bienne, Switzerland

[21] Appl. No.: 142,409

[22] PCT Filed: Mar. 24, 1993

[86] PCT No.: PCT/CH93/00083

§ 371 Date: Dec. 8, 1993

§ 102(e) Date: Dec. 8, 1993

[87] PCT Pub. No.: WO93/19405

PCT Pub. Date: Sep. 30, 1993

[30] Foreign Application Priority Data

Mar. 26, 1992 [CH] Switzerland ............... 00961/92

[51] Int. Cl.$^6$ ............... G04C 10/00; H01M 6/36
[52] U.S. Cl. ............... 368/205; 429/111
[58] Field of Search ............... 429/111; 136/291; 368/205

[56] References Cited

U.S. PATENT DOCUMENTS 5,350,644 9/1994 Graetzel et al. ............... 429/111

FOREIGN PATENT DOCUMENTS

| 56-51691 | 5/1981 | Japan . |
| 57-201878 | 12/1982 | Japan . |
| 59-116079 | 7/1984 | Japan . |
| 1-181477 | 7/1989 | Japan . |
| WO91-16719 | 10/1991 | WIPO ............... 429/111 |

Primary Examiner—Aaron Weisstuch
Attorney, Agent, or Firm—Pollock, Vande Sande & Priddy

[57] ABSTRACT

The present invention provides a horological piece (P) comprising an energy source having at least one photovoltaic cell (1) capable of transforming luminous radiation into an electrical current. This photovoltaic cell includes an active surface (F) sensitive to luminous radiation. A horometrical movement (56) is supplied by the energy source and is capable of supplying time keeping information. A display (58) is adapted to receive the time keeping information supplied by the horometrical movement (56) and displays this information so that it is readable by a user. The active surface (F) of the photovoltaic cell (1) has at least one transparent region which at least partially covers the display (58). The invention may be applied to horological pieces without portable power sources, such as a battery.

27 Claims, 6 Drawing Sheets

HOROLOGICAL PIECE COMPRISING A PHOTOVOLTAIC CELL HAVING A PHOTELECTROCHEMICAL REGION

TECHNICAL FIELD

The present invention concerns a horological piece provided with a source of energy constituted by one or several photovoltaic cells.

More particularly, the invention concerns a horological piece including at least one photovoltaic cell of the regenerating photoelectrochemical type comprising a semiconductor/electrolyte oxide interface.

BACKGROUND OF THE INVENTION

Horological pieces, such as watch-bracelets including a photovoltaic cell as an energy source, are already known. In these watches, the cell is generally located on the watch case or on the bracelet, at a location such that the cell may be exposed to sufficient luminous radiation to be able to assure the supply of current to the elements of the watch which function electrically.

The arrangement of the cell on the watch degrades its aesthetic appearance.

Further, this arrangement does not allow the photovoltaic cell to supply a sufficiently high voltage to assure the supply of current in all conditions of use, this being notably in conditions of weak lighting and of diffused light.

SUMMARY OF THE INVENTION

The aim of the present invention is to supply a horological piece provided with a photovoltaic cell responding to the above-mentioned problems, namely in which the said cell is arranged in such a way that it does not degrade the aesthetic appearance of this piece while at the same time providing a sufficient level of electrical supply.

To this effect, an object of the present invention is a horological piece including:
  an energy source including at least one photovoltaic cell capable of transforming luminous radiation into an electrical current, the photovoltaic cell including an active surface sensitive to luminous radiation,
  horometrical means supplied by said energy source and capable of supplying time keeping information, and
  display means adapted to receive said time keeping information supplied by said horometrical means and intended to display this information so as to be readable by a user, the horological piece being characterized in that the active surface of said photovoltaic cell has at least one transparent region which at least partially covers said displaying means.

It should also be explained that the active surface of the cell may cover the majority of said display means.

BRIEF DESCRIPTION OF THE DRAWINGS

Other characteristics and advantages of the invention will appear more clearly from the reading of the following detailed description, in which reference is made to the attached drawings given as examples only and in which.

DETAILED DESCRIPTION OF THE PREFERRED EMBODIMENT

In the context of the description which follows, the adjective "transparent" has the meaning transparent to visible light and non-diffusing of light.

Figure 1:
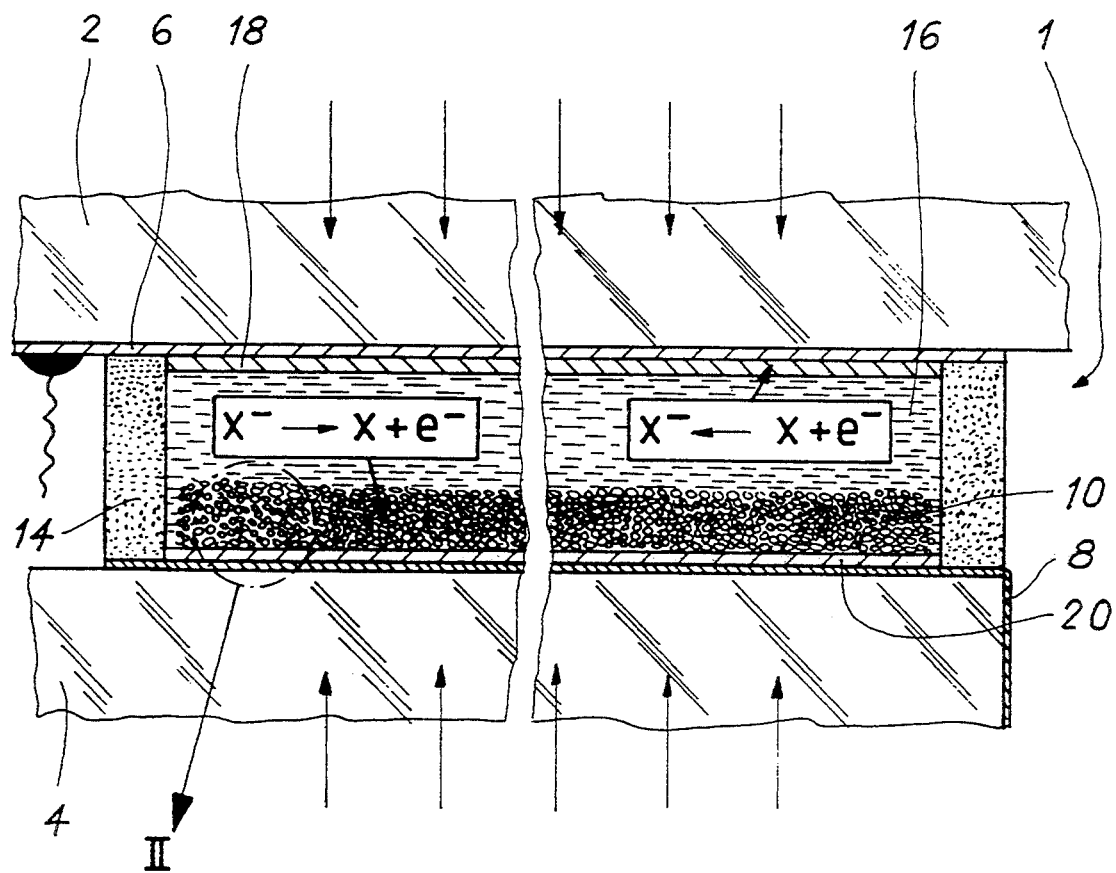
FIG. 1 is an interrupted schematic view representing a transverse section of a single photovoltaic cell, equipping the horological piece according to the invention.

Referring to FIG. 1, a regenerating photoelectrochemical cell is seen designated by the general reference 1.

The cell 1 comprises a first transparent substrate 2 and a second substrate 4 that is also transparent, these two substrates having respective transparent electrodes 6 and 8 over the entire surfaces of their opposing faces. To simplify the description, the electrodes 6, 8 could be designated first electrode and second electrode, respectively.

These electrodes 6, 8 are preferably produced in the form of a thin layer of a mixture of indium oxide/tin oxide or tin oxide/antimony oxide. The person skilled in the art will of course be able to choose any other equivalent transparent layer.

The substrate 4 also has a first layer 10 of a photoelectrochemically active semiconductor oxide made in the form of a porous nanostructure formed of sintered colloidal particles 12, which will be described in greater detail hereinafter.

The substrates 2 and 4 are joined together, for example, by a sealing frame 14 to define a space filled with an electrolyte 16 comprising a redox couple, in conventional manner. The electrolyte 16 impregnates the porous structure 10 in such a manner that the semiconductor electrolyte oxide interface has a very large effective surface.

According to the invention, the electrode 8 is covered with a second continuous and compact layer 20 of a semiconductor oxide.

The second semiconductor oxide layer 20 thus extends between the second electrode 8 and the first semiconductor oxide layer 10.

The continuous compact semiconductor oxide layer 20 makes it possible to limit or avoid any short circuit which could occur on the second electrode 8 between the oxidized and reduced forms of the redox couple contained in the electrolyte 16, and thereby to increase the voltage available to the terminals of the electrodes of the cell.

In the example shown, the electrode 6 is also covered with an electrocatalytic layer 18 which extends between the electrode 6 and the electrolyte 16.

The electrocatalytic layer 18 makes it possible to reduce the overvoltage for the reduction of the oxidized form of the redox couple contained in the electrolyte 16 and to improve the overall performance of the cell.

The electrocatalytic layer 18 may, for example, be deposited by the galvanic route or by deposition in a vacuum, and the semiconductor oxide layer 20 may, in turn, be, for example, deposited by chemical or physical vapor phase deposition.

It will be noted that the drawing does not reflect the exact dimensions of the cell formed in this manner, these dimensions being greatly exaggerated for reasons of clarity.

Figure 2:
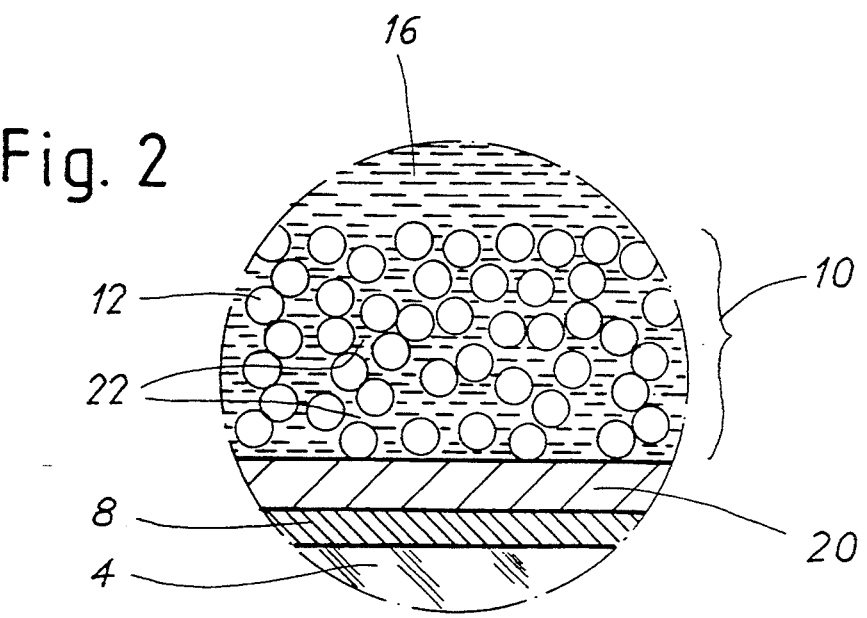
FIG. 2 is an enlarged view of a region II of FIG. 1.

Referring also to FIG. 2, this shows that the layer 10 has pores 22 formed by the spaces present between the particles 12 of the semiconductor oxide. These pores 22 are interconnected between each other and are filled with the electrolyte 16 in such a way that percolation of the latter through the layer 10 is easily effected.

The colloidal particles 12 are preferably 1 to 200 nanometers in diameter and form a layer between 10 and 20,000 nanometers thick at the surface of the substrate 4. This consequently leads to the production of a layer 10 presenting a very high effective surface, that is, a layer, the real surface/projected surface of which is of the order of 2000.

It will be noted in this connection that the small size of the particles 12, in connection with the small thickness of the layer 10, has the advantage of yielding a layer 10 which does not diffuse light.

Moreover, the size of the particles 12 and the thickness of the layer 10 have a large influence on the response of the layer 10 to incident light excitation.

The particles 12 of the layer 10 absorb photons, the energy of which is equal to or exceeds the energy difference between the conduction band and the valence band. The absorption of light, symbolized by the arrows in the drawing, thus leads to the creation of electron hole pairs in the particles 12, in contradistinction to particles covered with a film of chromophors according to the prior art. In this film, the incident light is absorbed by the chromophors and not by the semiconductor oxide. In this case, the electrons are transferred from the excitation levels of the chromophors into the conduction band of the semiconductor oxide, and the corresponding positive charges associated with the chromophors are trapped in the surface of the semiconductor, thereby provoking separation of the charges, and resulting in the desired photovoltaic effect.

In the case of a semiconductor oxide of the n type, such as $TiO_2$, the electrons are majority carriers whereas the conduction holes are the minority carriers. Thus, when a semiconductor/electrolyte device of this type is used to create electricity from absorbed light, it is necessary for the holes to diffuse up to the semiconductor/electrolyte junction before recombination with the electrons can occur. In other words, the length of diffusion of the minority carriers, designated lpm, must be longer than the distance which these carriers have to travel before reaching the junction. This diffusion length is defined by $$lpm = (2D_T)^{0.5}$$

in which T is the lifetime of a conduction hole and D is the diffusion constant of the minority carrier. By way of example, the value of lpm is 100 nanometers for $TiO_2$.

According to the invention, a layer of semiconductor oxide 10 is thus produced formed of an agglomeration of colloidal particles 12, the diameter of which is smaller than the diffusion length of the minority charge carriers in such a manner that these carriers are very likely to reach the semiconductor/electrolyte junction and to obtain effective separation of the charge carriers, so that the conversion efficiency is increased.

For the deposition of the layer 10, reference may for example be made to the deposition process for a layer of this type described in international patent application WO 91/16719 (U.S. Pat. No. 5,350,644).

The semiconductor oxide forming the layer 10 may be selected from the semiconductor oxides included in the following three groups:

The first group comprises oxides of the transition elements, oxides of the elements of columns 13 and 14 of the modern periodic classification table (see Cours de chimie physique by Paul Arnaud, published by Dunod 1988), and rare earth oxides.

The second group comprises mixed oxides comprising a mixture formed of two or more oxides of the first group.

The third group comprises mixed oxides comprising a mixture formed of one or more oxides of the first group with oxides of the elements of columns 1 and 2 of the modern periodic classification table.

The semiconductor oxide forming the layer 10 is preferably selected from the group of materials comprising $TiO_2$, $La_2O_3$, $ZrO_2$, $Nb_2O_5$, $WO_3$, $SrTiO_3$, $CaTiO_3$, sodium titanate, and potassium niobiate.

According to a special embodiment of the invention, the electrolyte 16 may be a liquid electrolyte and may preferably be selected from the electrolytes comprising a redox couple composed of cerium(III) sulfate and cerium(IV), sodium bromide and bromine, as well as lithium iodide and iodine in solution in one or another of the solvents selected from the group comprising water, N-methyloxazolidinone, nitromethane, propylene carbonate, ethylene carbonate, butyrolactone, dimethyl imidazolidine, N-methylpyrrolidine, or in a mixture of these solvents.

The oxidation and reduction reactions of the components present in the electrolyte have been symbolically represented in the drawing at the level of the electrolyte 16/electrocatalytic layer 18 and electrolyte 16/semiconductor oxide layer 10 interfaces.

According to another embodiment, the electrolyte 16 may also be solid and in this case a polymer electrolyte such as polyoxyethylene/LiI may be selected.

According to a variant of the embodiment comprising a solid electrolyte, the electrolyte 16 is preferably lithium iodide and pyridinium iodide.

The electrocatalytic layer 18 is preferably a transparent film formed of one to ten monomolecular layers of a metal selected from the group of metals comprising platinum, ruthenium, rhodium, palladium, iridium, osmium, and conducting oxides of the elements of columns 8 to 10 of the modern periodic classification table. The second semiconductor oxide layer 20 is advantageously of the same material as the first layer 10.

Figure 3:
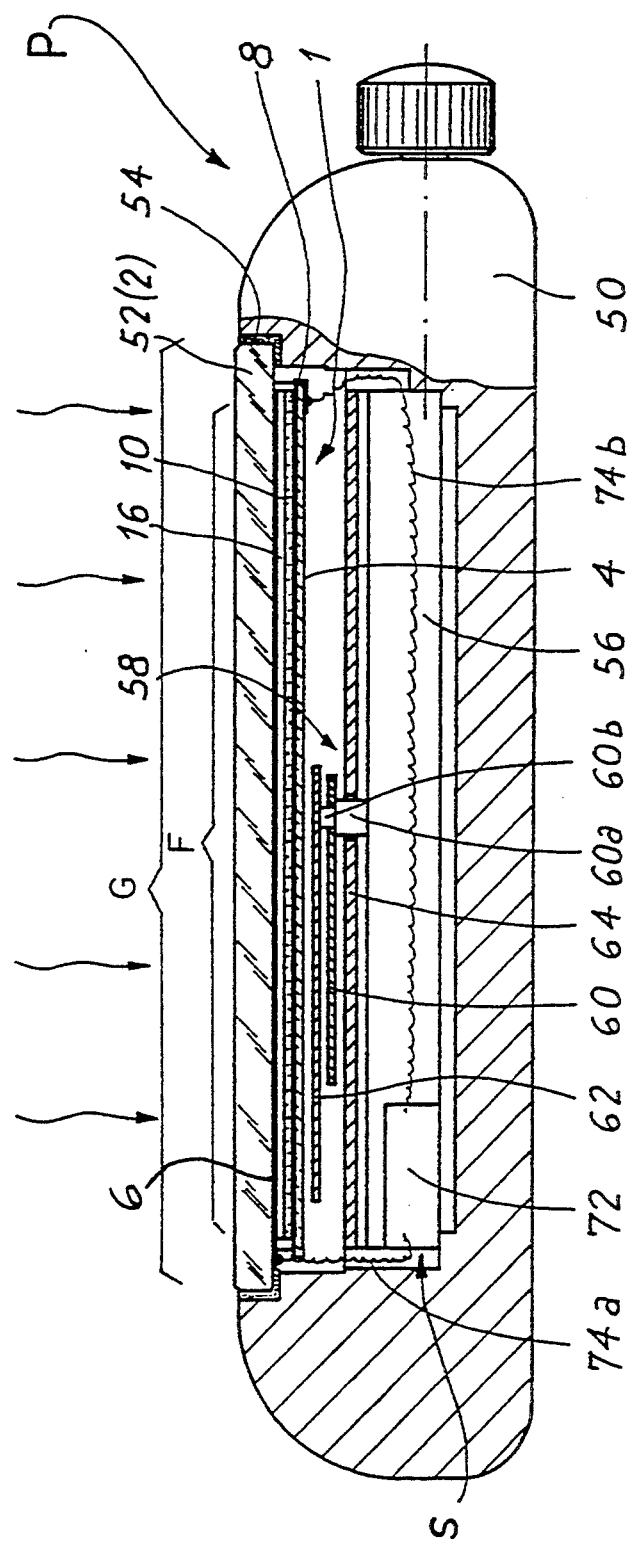
FIG. 3 is a cut-away view representing schematically a horological piece according to a first embodiment of the invention, equipped with a cell represented by FIG. 1.

Referring now to FIG. 3, a horological piece according to the invention will hereafter be described, the horological piece, which is identified by the general reference P, being equipped with a cell 1 such as that described previously.

The horological piece P includes a watchcase 50 which is represented in FIG. 3 in partial cross-section and on which is mounted a glass 52, for example by means of a joint 54. The glass 52 has a frontal surface G.

In the interior of the watchcase 50 is housed, in a classical manner, a movement 56 forming time and measuring means, called horometrical means, capable of supplying timekeeping information, such as for example the hour, the minute, and, the second.

The piece P further includes display means 58 which, in a classical manner, are adapted to receive the timekeeping information supplied by the horometrical means 56 and which are intended to display this information in order that it should be readable by a user.

The display means 58 are constituted in this represented example by indicators of the hour and the minute formed respectively by an hour-hand 60 and a minute-hand 62 disposed with regard to a dial 64. In a classical manner, the hour hand 60 is driven by an hour-shaft 60$a$, while the minute-hand 62 is driven by a minute-shaft 60$b$. The shafts 60$a$ and 60$b$ are connected to the motor elements of the movement 56, elements which are guided by a time base of this movement (not represented).

The arrangement and the cooperation of the horometrical means 56 and displaying means 58 being thus of a classic form, a more detailed description will not be supplied herewith.

The piece P according to the invention includes an energy source S, including a photovoltaic cell 1 of the type which has been previously described. The cell 1 has been represented in FIG. 3 in a much more schematic manner than in FIG. 1 for the reason of clarity of the drawings. For this same reason, certain layers of the cell 1 described in relation to FIGS. 1 and 2 have been omitted from FIGS. 3, 5, and 6.

Figure 7:
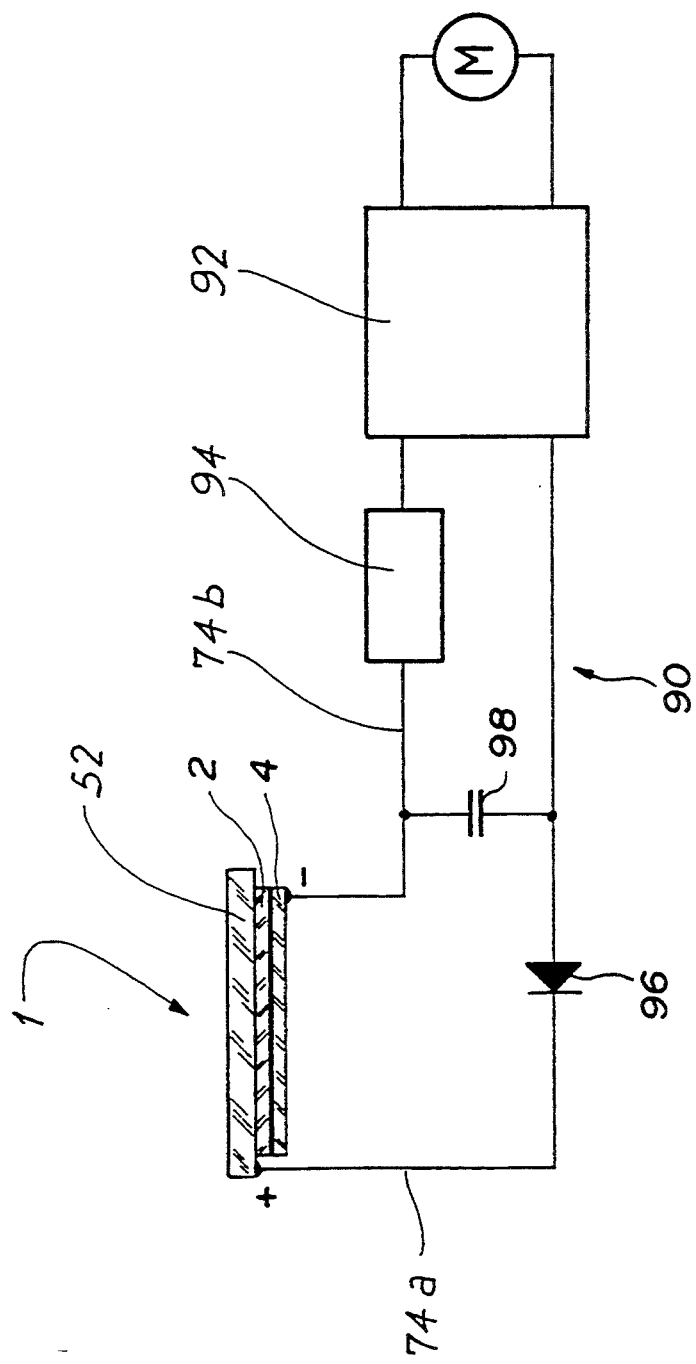
FIG. 7 is a schematic representation of an electrical power supply circuit equipped with a cell of the horological piece according to the invention and supplying a current to an electrically operating element of this piece, such as a motor.

As will be understood, this cell 1 which is only slightly, or not at all, absorbant in the visible and non diffusing regions, is capable of transforming luminous radiation in the emission region, into an electric current for supplying the horometrical means 56, via an electrical power supply circuit 72 represented in a more detailed manner in FIG. 7. To this effect, the cell 1 is connected to the power supply circuit 72 by means of conductors 74$a$ and 74$b$.

The cell 1 is advantageously located between the glass 52 and the display means 58. More particularly, this cell 1 engages the glass 52 and is arranged directly therebelow.

More precisely, it will be noted that the cell 1 is secured to the glass 52.

In fact, in the embodiment of FIG. 3, one of the substrates of the cell 1, in this example that referenced by the designation 52(2), is constituted by the glass 52 itself. The glass 52 on which the electrode 6 is arranged thus forms an integral part of the cell 1. The cell 1 is thus suspended from the glass 52.

Figure 4:
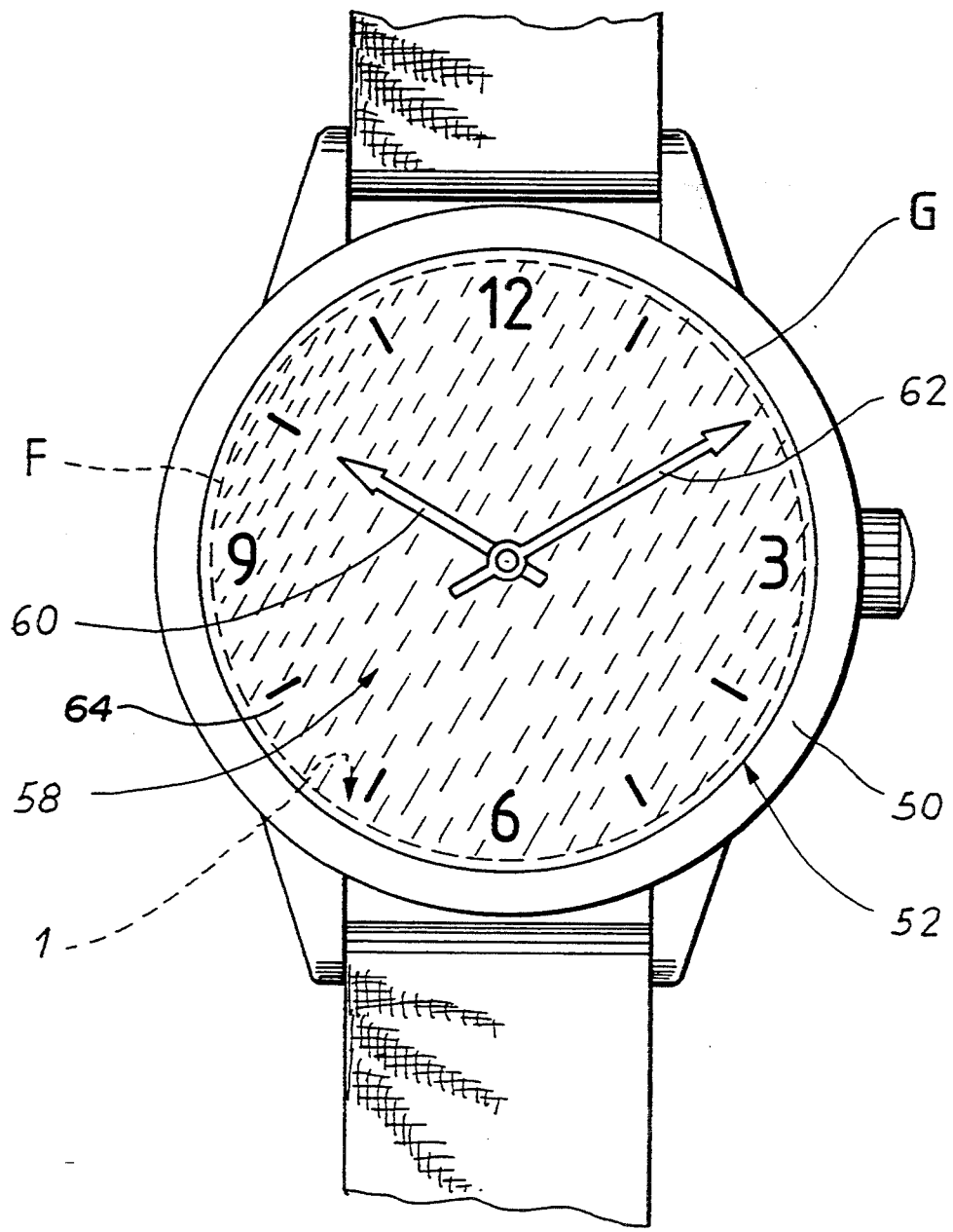
FIG. 4 is a plan view of the piece of FIG. 3.

As can be seen in FIGS. 3 and 4, the cell 1 entirely covers the display means 58 and extends along the majority of the front surface of the dial 64.

Even though the embodiment described here is a preferred embodiment, it should be explained that the cell may occupy a part of the front surface of the dial in order to cover only a part of the display means 58.

The cell 1 has an active surface F which is represented in FIG. 4 by hatchings within broken lines. This surface corresponds to the frontal projection of the stack of different layers arranged in this cell 1. The active surface F corresponds mainly to the frontal surface G of the glass 52. It will be noted to the effect that this cell has, at least in its frontal projection, a geometric form which is of the same nature as that of the glass 52, these two elements being in this example circular.

Given that the cell 1 is entirely transparent and slightly or preferably not at all absorbant, or diffusing, the display means 58 are perfectly visible through this cell.

Figure 5:
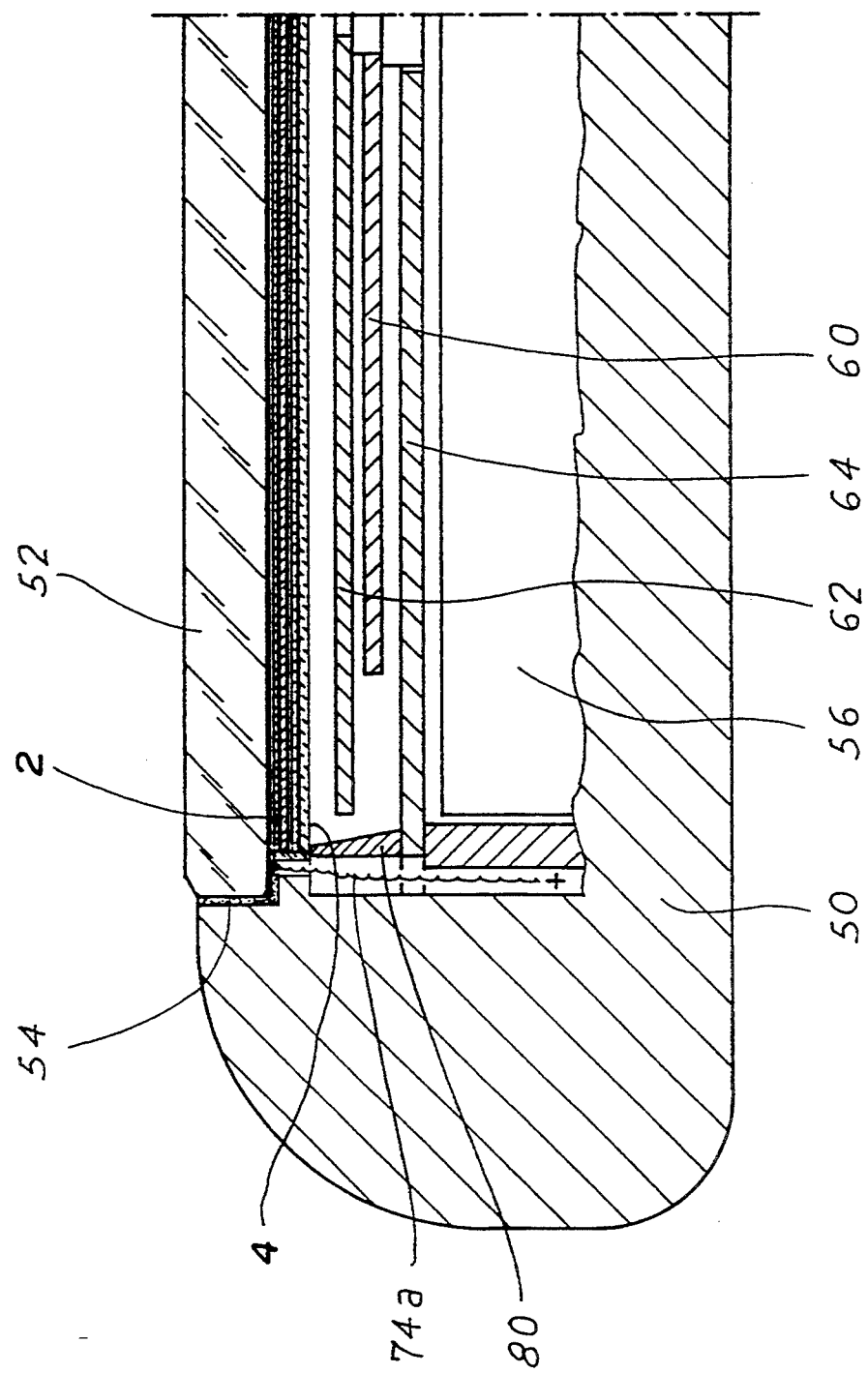
FIG. 5 is a cross-sectional view of part of a horological piece according to a second embodiment.

In the second embodiment represented in FIG. 5, the cell 1 is independent of the glass 52 but remains disposed directly therebelow. The substrate 2 of the cell 1 is thus placed against the glass 52 without being joined thereto. The cell 1 is maintained between the glass 52 and a ring 80 forming a flange placed on the dial 64.

Figure 6:
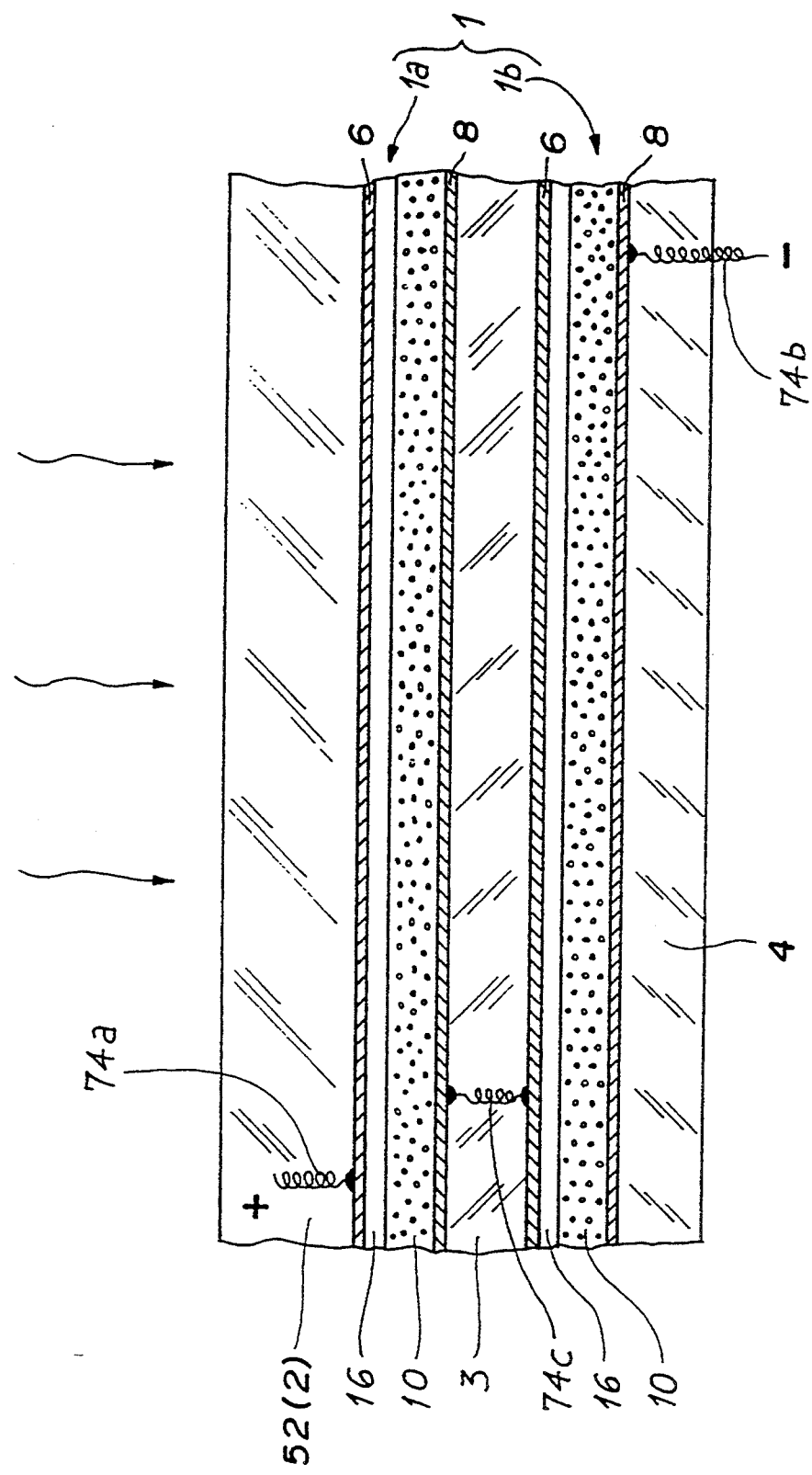
FIG. 6 is a very schematic cross-sectional view of part of a cell according to a variation of the embodiment.

In the variation of the embodiment of FIG. 6, this cell 1 is, as in the piece of FIG. 3, integral with the glass 52. Nevertheless, the piece P includes here two cells, respectively upper cell 1$a$ and lower cell 1$b$, of the same frontal surface, superposed and mounted in series.

The cells 1$a$ and 1$b$ thus include a common substrate 3, or intermediate substrate.

The cells 1$a$ and 1$b$ have an identical structure to that of the cell of FIG. 1.

The intermediate substrate or common substrate 3 includes on opposite sides electrodes 6 and 8, respectively, namely an electrode 8 of the upper cell 1$a$ and an electrode 6 of the lower cell 1$b$.

The conductor 74$a$ is connected to the electrode 6 of the upper cell 1$a$, whilst the conductor 74$b$ is connected to the electrode 8 of the lower cell 1$b$.

The two cells 1$a$ and 1$b$, and notably their electrodes 8 and 6 are connected to each other by a common conductor 74$c$.

The FIG. 7 represents a schematic view of a supply 90 connected to the cell 1 and allowing the supply of an electrically operating element M of the horological piece.

The element M is consituted here by a motor driven by a watch control circuit 92 of a classic structure to which the motor M is electrically connected.

The conductors 74$a$ and 74$b$ are connected to the control circuit 92. On the conductor 74$b$, and between the negative terminal of the cell 1 and the control circuit 92, is connected a voltage stabilization circuit 94 of a classical structure.

Further, on the conductor 74$a$, and between the positive terminal and the control circuit 92, is connected a diode 96. In addition, a capacitor 98 having a high capacitance, and known by the trademark "gold cap", is connected between the two conductors 74$a$ and 7$b$.

The horological piece which has just been described is equipped with a non absorbant cell, called clear cell.

This invention is nevertheless not limited to this type of application and may extend to horological pieces having a cell in which a very small amount of colorant formed by a monomolecular layer of chromophore is used, located on the surface of the particles 12 of the porous layer 10.

It will thus be understood from what has just been described that a horological piece has been provided, such as a watch-bracelet, this piece having a photoelectrochemical cell which does not diffuse incident light and which does not absorb, or only slightly, absorbs light emitted in the bandwidth in the region of visible light. This cell, by entirely covering the dial, and thus the display means, benefits from an energy contribution which is sufficient to assure the operation of the horological piece according to the invention. This characteristic is obtained because of the elevated rate of conversion of the energy supplied by the incident light into electrical energy.

What is claimed is:

1. A horological piece comprising:
    an energy source including at least one photovoltaic cell capable of transforming luminous radiation into an electrical current, this photovoltaic cell including an active surface sensitive to luminous radiation,
    horometrical means supplied by said energy source and capable of supplying time keeping information, and
    display means adapted to receive the time keeping information supplied by the horometrical means and to display this information so that it is readable by a user,
    the active surface of said photovoltaic cell having at least one transparent region which at least partially covers the display means,
    said transparent region comprising a first transparent substrate which has thereon a first transparent electrode, and a second transparent substrate which has thereon a second transparent electrode on which is deposited a first layer of a photoelectrochemically active semiconductor oxide in the form of a porous nanostructure of sintered colloidal particles,
    said substrates being so disposed in relation to one another as to define a space filled with electrolyte,
    said electrolyte impregnating said porous structure in a manner such that it is in electrical contact on the one hand with the first transparent electrode disposed on the first transparent substrate and on the other hand with the second transparent electrode disposed on the second transparent substrate,
    and said second transparent substrate also having thereon a second semiconductor oxide layer which is compact, continuous and extends between the second electrode and the first semiconductor oxide layer.

2. A horological piece according to claim 1, wherein said active surface covers a majority of the display means.

3. A horological piece according to claim 2, wherein substantially the entire active surface of the cell is transparent.

4. A horological piece according to claim 3, wherein said cell is located between a glass member of said horological piece and said display means.

5. A horological piece according to claim 4, wherein said cell engages said glass member.

6. A horological piece according to claim 5, wherein said cell is located directly under the glass member.

7. A horological piece according to claim 6, wherein said cell is suspended from the glass member.

8. A horological piece according to claim 7, wherein at least one of the substrates of said cell is constituted by said glass member.

9. A horological piece according to claim 1, wherein the entire active surface of the cell is transparent.

10. A horological piece according to claim 1, wherein said cell is located between a glass member of said horological piece and said display means.

11. A horological piece according to claim 10, wherein said cell engages said glass member.

12. A horological piece according to claim 10, wherein said cell is located directly under the glass member.

13. A horological piece according to claim 12, wherein said cell is suspended from the glass member.

14. A horological piece according to claim 1, wherein at least one of the substrates of said cell is constituted by a glass member of said horological piece.

15. A horological piece according to claim 1, wherein the second semiconductor oxide layer is of the same material as the first semiconductor oxide layer.

16. A horological piece according to claim 1, wherein the first transparent substrate also has thereon an electrocatalytic layer extending between the first transparent electrode and the electrolyte.

17. A horological piece according to claim 16, wherein the electrocatalytic layer is made up of a plurality of monomolecular layers of a material selected from the group consisting of the metals platinum, ruthenium, rhodium, palladium, iridium, and osmium, and the conducting oxides of the elements of columns 8 to 10 of the modern periodic classification table.

18. A horological piece according to claim 1, wherein the colloidal particles forming the first semiconductor oxide layer have a diameter in the range of 1 to 200 nanometers.

19. A horological piece according to claim 1, wherein the porous structure of the first semiconductor oxide layer has a thickness in the range of 10 to 20,000 nanometers.

20. A horological piece according to claim 1, wherein the materials of the semiconductor oxide layers are selected from semiconductor oxides of a first group consisting of the oxides of the transition elements, the oxides of the elements of columns 13 and 14 of the modern periodic classification table and the oxides of rare earth metals, of a second group consisting of mixed oxides formed of a mixture of two or more oxides of the first group, and of a third group consisting of mixed oxides formed of a mixture of one or more oxides of the first group with the oxides of the elements of columns 1 and 2 of the modern periodic classification table.

21. A horological piece according to claim 20, wherein the semiconductor oxide materials are selected from the group consisting of $TiO_2$, $La_2O_3$, $ZrO_2$, $Nb_2O_5$, $WO_3$, $SrTiO_3$, $CaTiO_3$, sodium titanate, and potassium niobiate.

22. A horological piece according to claim 1, wherein the electrolyte is a liquid electrolyte selected from the group of electrolytes consisting of a redox couple of cerium(III) sulfate and cerium(IV), a redox couple of sodium bromide and bromine, and a redox couple of lithium iodide and iodine in solution in one or more solvents selected from the group consisting of water, N-methyloxazolidinone, nitromethane, propylene carbonate, ethylene carbonate, butyrolactone, dimethyl imidazolidine, N-methylpyrrolidine, and a mixture of said solvents.

23. A horological piece according to claim 1, wherein the electrolyte is a solid.

24. A horological piece according to claim 23, wherein the electrolyte comprises a polymer electrolyte.

25. A horological piece according to claim 24, wherein the electrolyte comprises polyoxyethylene/LiI.

26. A horological piece according to claim 23, wherein the electrolyte comprises lithium iodide and pyridinium iodide.

27. A horological piece according to claim 1, wherein the colloidal particles forming the first semiconductor oxide layer have a diameter which is smaller than the diffusion length of minority charge carriers.

* * * * *